US012323572B1

(12) United States Patent
Mudd

(10) Patent No.: US 12,323,572 B1
(45) Date of Patent: Jun. 3, 2025

(54) STEREOSCOPIC CAMERA SYSTEM FOR A WELDING TORCH

(71) Applicant: Floyd Mudd, Nobleton, FL (US)

(72) Inventor: Floyd Mudd, Nobleton, FL (US)

(*) Notice: Subject to any disclaimer, the term of this patent is extended or adjusted under 35 U.S.C. 154(b) by 132 days.

(21) Appl. No.: 18/200,665

(22) Filed: May 23, 2023

(51) Int. Cl.
*H04N 13/344* (2018.01)
*G03B 29/00* (2021.01)
*H04N 13/133* (2018.01)
*H04N 13/194* (2018.01)
*H04N 13/239* (2018.01)
*H04N 13/398* (2018.01)
*H04N 23/52* (2023.01)
*H04N 23/54* (2023.01)

(52) U.S. Cl.
CPC .......... *H04N 13/344* (2018.05); *G03B 29/00* (2013.01); *H04N 13/133* (2018.05); *H04N 13/194* (2018.05); *H04N 13/239* (2018.05); *H04N 13/398* (2018.05); *H04N 23/54* (2023.01); *H04N 23/52* (2023.01)

(58) Field of Classification Search
CPC .. H04N 13/344; H04N 13/133; H04N 13/194; H04N 13/239; H04N 13/398; H04N 23/54; H04N 23/52; G03B 29/00
See application file for complete search history.

(56) References Cited

U.S. PATENT DOCUMENTS

| | | | |
|---|---|---|---|
| 4,450,339 A | 5/1984 | Corby, Jr. | |
| 4,521,670 A | 6/1985 | Case, Jr. | |
| 5,329,089 A | 7/1994 | McGee | |
| 6,046,431 A | 4/2000 | Beattie | |
| 9,589,481 B2 | 3/2017 | Becker | |
| 9,808,148 B2 | 11/2017 | Miller | |
| 2016/0125653 A1* | 5/2016 | Denis | G06F 3/012 348/90 |
| 2016/0193681 A1 | 7/2016 | Pesme | |
| 2018/0177992 A1 | 6/2018 | Smith | |
| 2020/0154059 A1* | 5/2020 | Derry | H04N 23/60 |
| 2022/0100030 A1* | 3/2022 | Dong | G02B 27/286 |
| 2022/0323257 A1* | 10/2022 | Quijada | A61F 9/06 |

FOREIGN PATENT DOCUMENTS

CA    1197571    12/1985

* cited by examiner

*Primary Examiner* — Nasim N Nirjhar

(57) ABSTRACT

The stereoscopic camera system for a welding torch includes a welding helmet and a camera assembly. The welding helmet May be adapted to be worn by a user to protect the user's face while the user operates metalworking equipment. The camera assembly may couple to the metalworking equipment such that a workpiece may be located within a field of view of one or more cameras located on the camera assembly. A display system coupled to the welding helmet may be adapted to show the user the workpiece as seen by the one or more cameras. As non-limiting examples, the metalworking equipment may be a welder, a grinder, or a cutting torch. As a non-limiting example, the camera assembly may be coupled to a MIG gun.

19 Claims, 4 Drawing Sheets

STEREOSCOPIC CAMERA SYSTEM FOR A WELDING TORCH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of welding systems, more specifically, a stereoscopic camera system for a welding torch.

SUMMARY OF INVENTION

The stereoscopic camera system for a welding torch comprises a welding helmet and a camera assembly. The welding helmet may be adapted to be worn by a user to protect the user's face while the user operates metalworking equipment. The camera assembly may couple to the metalworking equipment such that a workpiece may be located within a field of view of one or more cameras located on the camera assembly. A display system coupled to the welding helmet may be adapted to show the user the workpiece as seen by the one or more cameras. As non-limiting examples, the metalworking equipment may be a welder, a grinder, or a cutting torch. As a non-limiting example, the camera assembly may be coupled to a MIG gun.

An object of the invention is to provide a welding helmet comprising an opaque shell, a headband, and a display system.

Another object of the invention is to provide a camera assembly that may couple to metalworking equipment via a clamp assembly.

A further object of the invention is to provide a camera assembly that may comprise an adjustable boom, a camera coupler, and one or more cameras.

Yet another object of the invention is to render on the display system a monoscopic or stereoscopic of a workpiece as seen by the one or more cameras.

These together with additional objects, features and advantages of the stereoscopic camera system for a welding torch will be readily apparent to those of ordinary skill in the art upon reading the following detailed description of the presently preferred, but nonetheless illustrative, embodiments when taken in conjunction with the accompanying drawings.

In this respect, before explaining the current embodiments of the stereoscopic camera system for a welding torch in detail, it is to be understood that the stereoscopic camera system for a 24 welding torch is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the stereoscopic camera system for a welding torch.

It is therefore important that the claims be regarded as including such equivalent construction insofar as they do not depart from the spirit and scope of the stereoscopic camera system for a welding torch. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
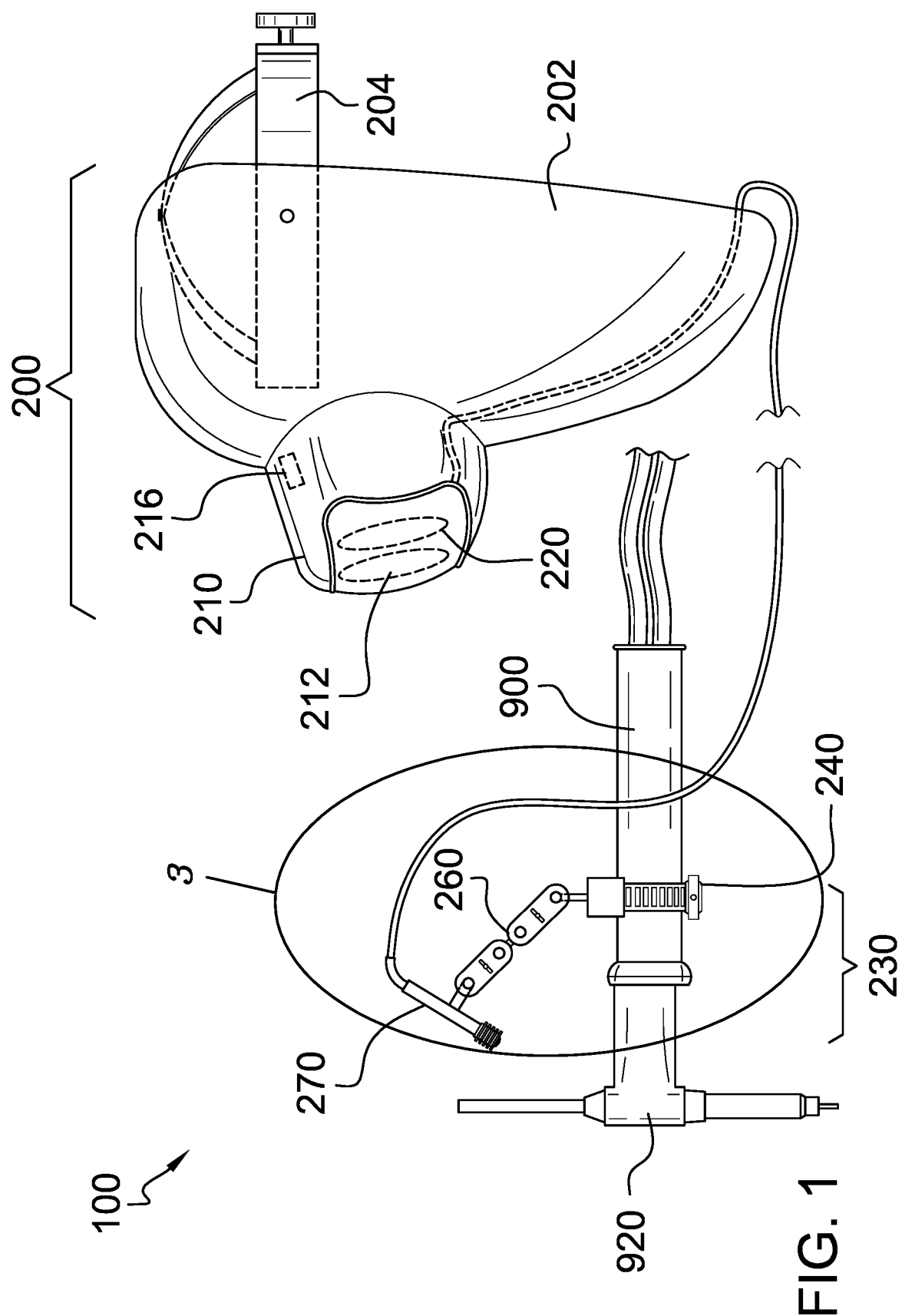
FIG. 1 is a side view of an embodiment of the disclosure.
Figure 2:
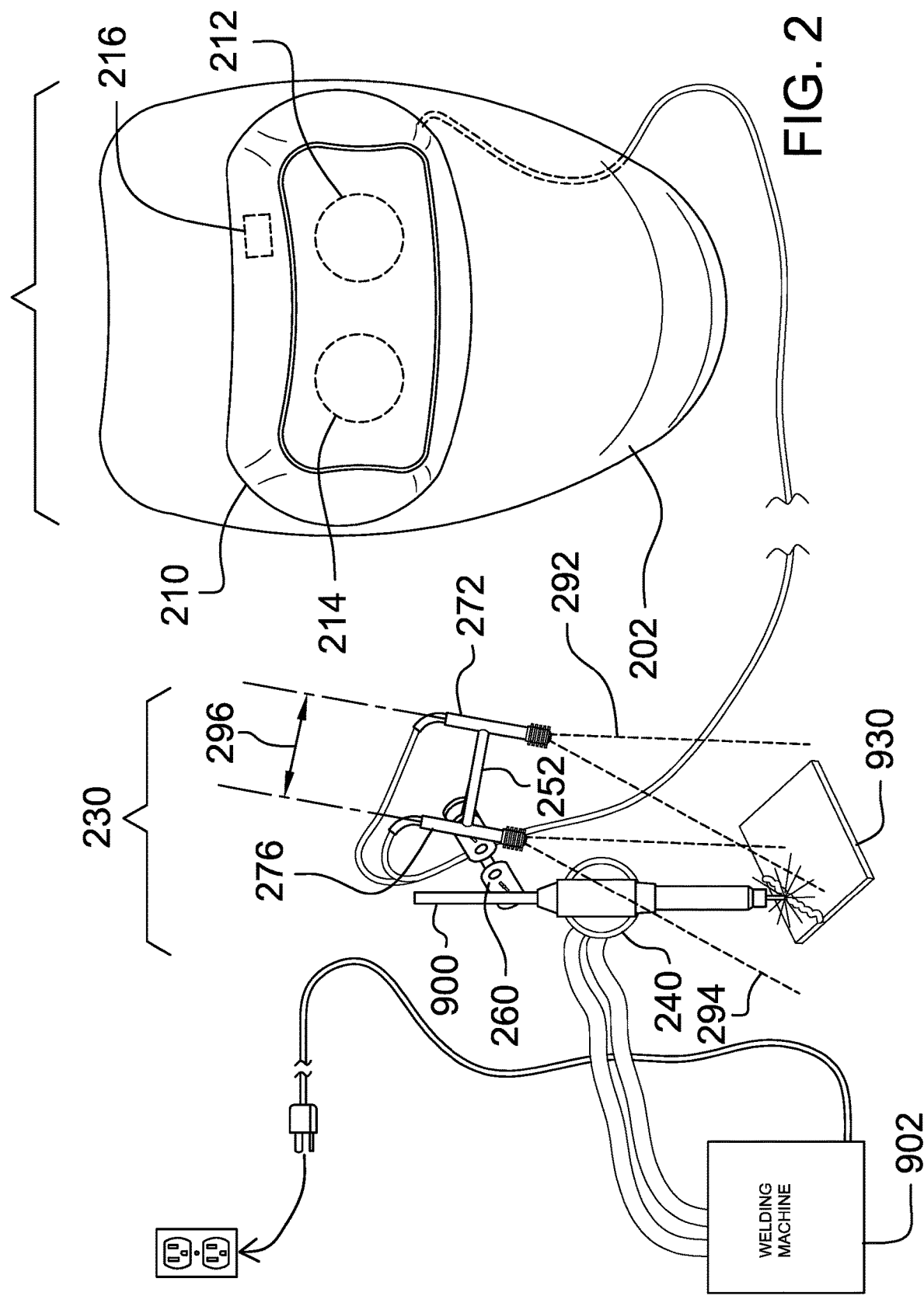
FIG. 2 is a front view of an embodiment of the disclosure.
Figure 3:
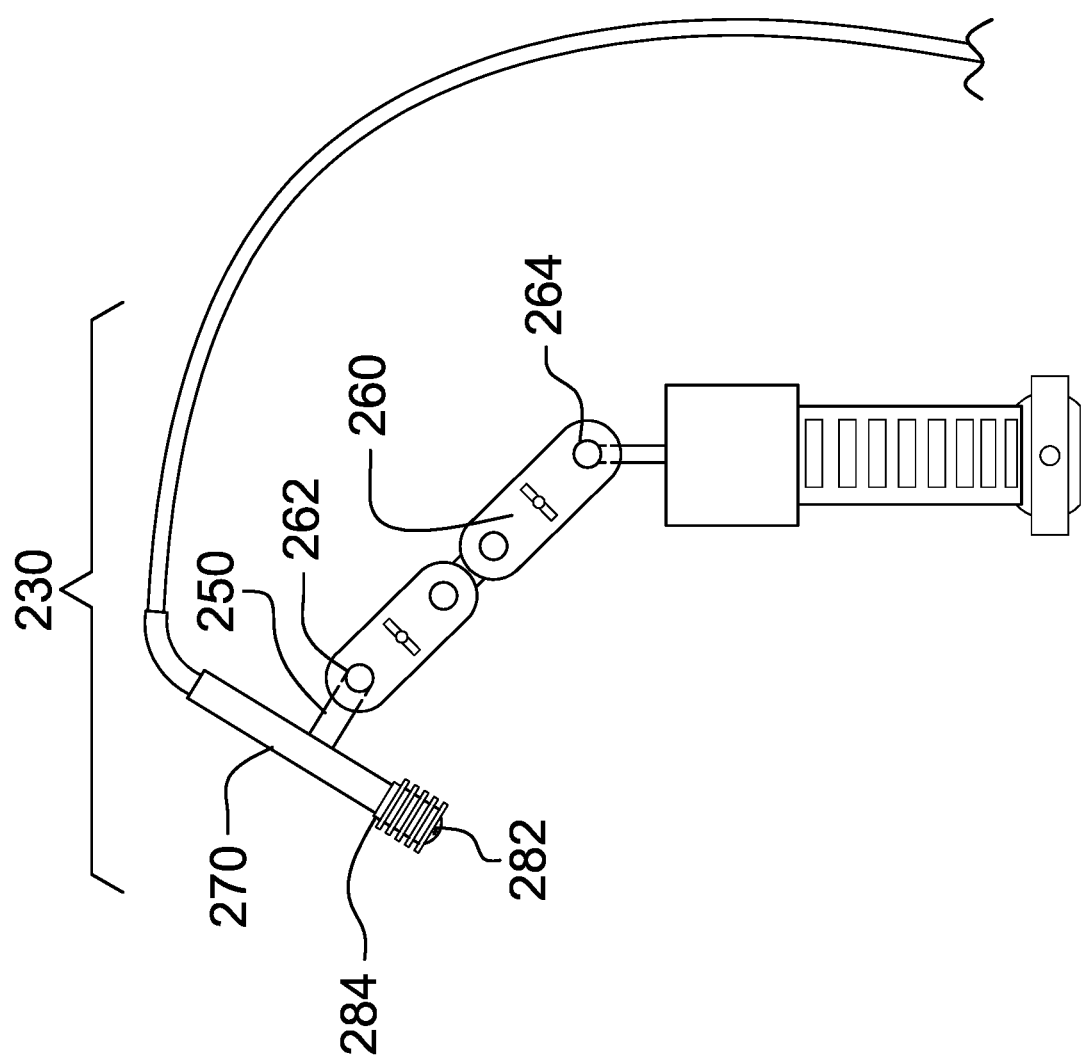
FIG. 3 is a detail view of an embodiment of the disclosure, illustrating the camera assembly.
Figure 4:
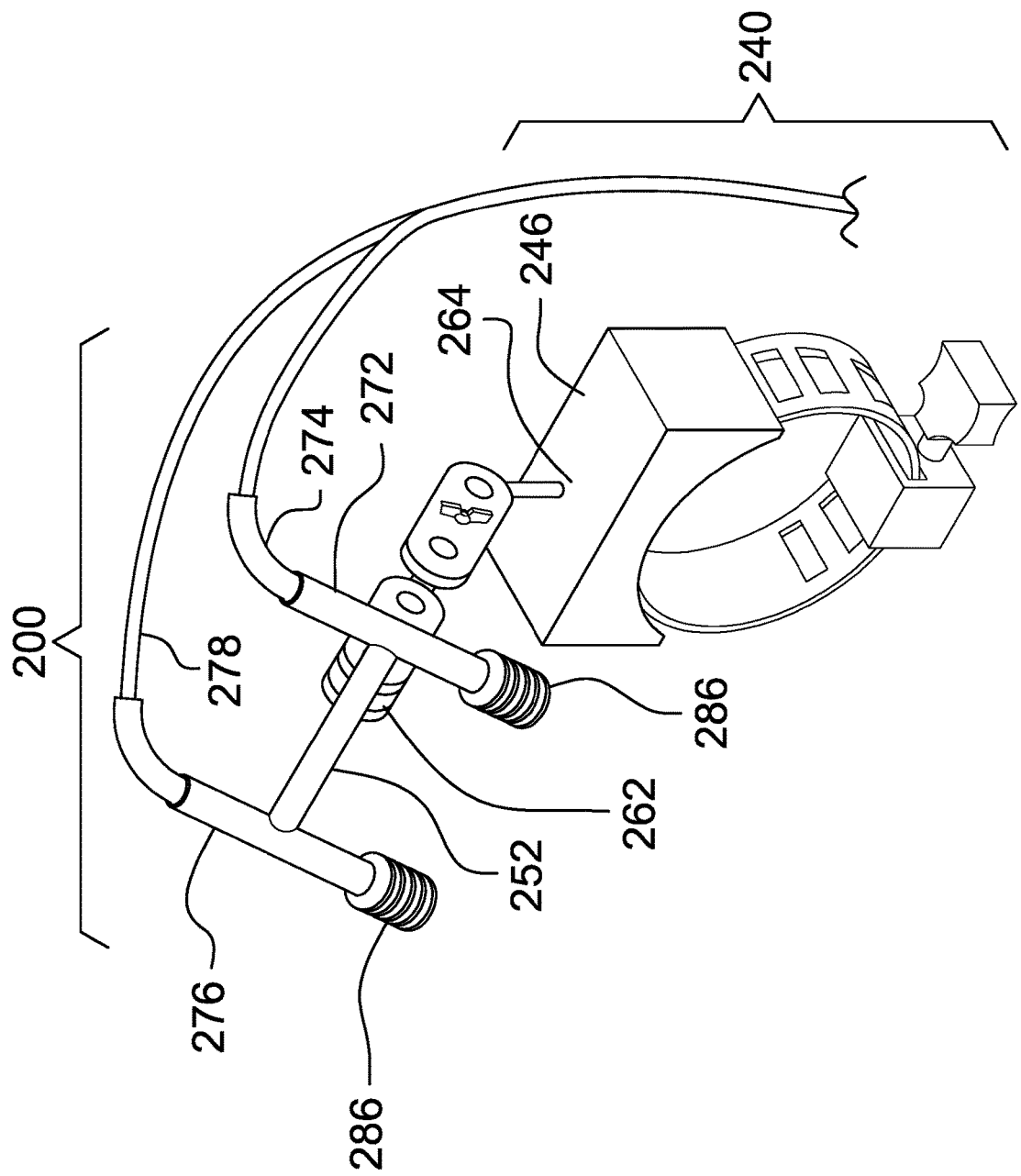
FIG. 4 is a front isometric view of an embodiment of the disclosure, illustrating the camera assembly.

Detailed reference will now be made to a first potential embodiment of the disclosure, which is illustrated in FIGS. 1 through 4.

The stereoscopic camera system for a welding torch 100 (hereinafter invention) comprises a welding helmet 200 and a camera assembly 230. The welding helmet 200 may be adapted to be worn by a user to protect the user's face while the user operates metalworking equipment 900. The camera assembly 230 may couple to the metalworking equipment 900 such that a workpiece 930 may be located within a field of view of one or more cameras 270 located on the camera assembly 230. A display system 210 coupled to the welding helmet 200 may be adapted to show the user the workpiece 930 as seen by the one or more cameras 270. As non-limiting examples, the metalworking equipment 900 may be a welder 902, a grinder, or a cutting torch. As a non-limiting example, the camera assembly 230 may be coupled to a MIG gun 920 of the welder 902.

The welding helmet 200 may comprise an opaque shell 202, a headband 204, and the display system 210. The welding helmet 200 may be adapted to protect the user from flash burn, sparks, infrared and ultraviolet light, heat, or any combination thereof. The opaque shell 202 may be adapted to be worn in front of the user's face and may be held in place by the headband 204. The headband 204 may be adapted to adjust in order to match the size of the user's head.

The display system 210 may be a pair of active displays that may be coupled to the front of the opaque shell 202. The display system 210 may be adapted to be positioned in front of the user's eyes. The display system 210 may comprise a left eye display 212 and a right eye display 214. The left eye display 212 may be adapted to be positioned in front of the user's left eye and the right eye display 214 may be adapted to be positioned in front of the user's right eye. Images presented on the left eye display 212 and the right eye display 214 may be a sequence of frames that render the workpiece 930 located within the field of view of the one or more cameras 270. The images presented on the left eye display 212 and the images presented on the right eye display 214 may be controlled by a video controller 216 located within the display system 210. The images presented on the left eye display 212 and the images presented on the right eye display 214 may be the same or may be different.

The video controller 216 may receive one or more electrical signals from the one or more cameras 270. The video controller 216 may be adapted to control what the user sees in the display system 210 by routing the one or more electrical signals to the left eye display 212 and to the right eye display 214 and by managing attributes of the images for viewability of the workpiece 930. As a non-limiting example, the video controller 216 may reduce the brightness of the images to reduce the brightness of a welding arc.

In some embodiments, a left eye lens 220 and a right eye lens may be positioned within the display system 210. The left eye lens 220 may be adapted to shorten the focal length between the user's left eye and the left eye display 212. The right eye lens may be adapted to shorten the focal length between the user's right eye and the right eye display 214.

The camera assembly 230 may comprise a clamp assembly 240, a camera coupler 250, an articulated boom 260, and the one or more cameras 270. The clamp assembly 240 may removably couple to the metalworking equipment 900. The camera coupler 250 may be operable to support the one or more cameras 270. The articulated boom 260 may couple the camera coupler 250 to the clamp assembly 240 such that the orientation of the one or more cameras 270 may be altered.

The clamp assembly 240 may comprise a left jaw 242, a right jaw 244, a ball joint interface 246, and a plurality of tighteners 248. The left jaw 242 and the right jaw 244 may be parallel plates that may be operable to press against the metalworking equipment 900 from opposing sides of the metalworking equipment 900. The ball joint interface 246 may be coupled to at least one of the left jaw 242 and the right jaw 244. The articulated boom 260 may couple to the ball joint interface 246 such that the articulated boom 260 may be repositioned.

The plurality of tighteners 248 may be operable to increase and decrease the amount of pressure applied to the metalworking equipment 900 by the clamp assembly 240. The plurality of tighteners 248 may be loosened to reduce the pressure so that the clamp assembly 240 may be repositioned or removed. The plurality of tighteners 248 may be tightened to increase the pressure so that the clamp assembly 240 may retain an orientation on the metalworking equipment 900. As a non-limiting example, the plurality of tighteners 248 may be bolts and nuts.

The camera coupler 250 may be an armature to which the one or more cameras 270 may be coupled.

The articulated boom 260 may couple the camera coupler 250 to the clamp assembly 240 such that the one or more cameras 270 may be reoriented by repositioning the articulated boom 260 and/or by repositioning the camera coupler 250. The bottom of the articulated boom 260 may be coupled to the clamp assembly 240 via a lower ball joint 264. The lower ball joint 264 may enable the articulated boom 260 to rotate 360 degrees and to change a boom elevation angle. The top of the articulated boom 260 may be coupled to the camera coupler 250 via an upper ball joint 262. The upper ball joint 262 may enable the camera coupler 250 to rotate 360 degrees and to change a camera coupler elevation angle. By providing both the lower ball joint 264 and the upper ball joint 262, the articulated boom 260 may achieve 3-axis articulation.

The one or more cameras 270 may be operable to convert light from a scene in front of the one or more cameras 270 into the one or more electrical signals that may encode the image of the scene. The one or more electrical signals may be routed to the left eye display 212 and/or to the right eye display 214 to render the original scene.

A first camera 272 may be coupled to the camera coupler 250. The camera coupler 250 and the articulated boom 260 may be adjusted to point the first camera 272 towards the workpiece 930. The first camera 272 may convert light visible within a first field of view 292 into the one or more electrical signals. A first video cable 274 may transmit the one or more electrical signals from the first camera 272 to the video controller 216. The video controller 216 may route the one or more electrical signals from the first camera 272 to the left eye display 212, to the right eye display 214, or to both.

In some embodiments, the camera coupler 250 may be a T-shaped armature 252 and a second camera 276 may be coupled to the camera coupler 250 along with the first camera 272. The second camera 276 may be mounted at a predetermined separation distance 296 from the first camera 272. The camera coupler 250 and the articulated boom 260 may be adjusted to point the first camera 272 and the second camera 276 towards the workpiece 930. The second camera 276 may convert light visible within a second field of view 294 into the one or more electrical signals. A second video cable 278 may transmit the one or more electrical signals from the second camera 276 top the video controller 216. The video controller 216 may route the one or more electrical signals from the first camera 272 to the left eye display 212 and the one or more electrical signals from the second camera 276 to the right eye display 214 to provide a stereoscopic view of the workpiece 930. Alternatively, the video controller 216 may route the one or more electrical signals from the first camera 272 or the second camera 276 to both the left eye display 212 and the right eye display 214 to provide a monoscopic view of the workpiece 930.

In some embodiments, the first video cable 274 and the second video cable 278 may merge to be routed through a single, multi-conductor cable.

An individual camera selected from the first camera 272 and the second camera 276 may comprise an optical sensor 284 which may convert the pattern of light striking the optical sensor 284 into the one or more electrical signals. The individual camera may further comprise a camera lens 282 to focus the light onto the optical sensor 284.

In some embodiments, the individual camera may comprise a heat sink 286 at the end of the individual camera that is closest to the workpiece 930 to assure than any heat generated by working the workpiece 930 does not damage the optical sensor 284.

In use, the camera assembly 230 may be coupled to the metalworking equipment 900 by placing the clamp assembly 240 onto the metalworking equipment 900 and tightening the plurality of tighteners 248. The position of the articulated boom 260 and the camera coupler 250 may be adjusted such that the one or more cameras 270 point towards the workpiece 930 while the metalworking equipment 900 is in use. The user may don the welding helmet 200 by placing the opaque shell 202 in front of the user's face with the headband 204 on top of the user's head. The fit of the headband 204 may be adjust for comfort and secure retention. Light from the workpiece 930 may impinge upon the optical sensors 284 within the one or more cameras 270 and May be converted into the one or more electrical signals. The one or more electrical signals may be passed to the video controller 216 within the welding helmet 200 over the first video cable 274 and/or the second video cable 278. The video controller 216 may render images on the left eye display 212 and the right eye display 214 and may adjust the brightness, contrast, or other attributes of the images. As a non-limiting example, the video controller 216 may reduce the brightness of part or all of the images to reduce the brightness of a welding arc. The left eye display 212 and the right eye display 214 may be positioned within the welding helmet 200 in front of the user's eyes such that the user may view the workpiece 930. The video controller 216 may present two different images—the left eye display 212 may display the image from the first camera 272 and the right eye display 214 may display the image from the second camera 276 such that the left eye display 212 and the right eye display 214 provide a stereoscopic view of the workpiece 930.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "ball joint" may refer to a type of ball and socket coupling that allows at least limited rotation around three perpendicular axis.

As used in this disclosure, a "camera" may be a sensor that converts light into electric signals that encode the spatial orientation of the captured light in a manner that reproduces the images seen by a human eye.

As used herein, the words "couple", "couples", "coupled" or "coupling", may refer to connecting, either directly or indirectly, and does not necessarily imply a mechanical connection.

As used herein, "encode" may refer to altering a signal, a message, or a dataset to embed information into the signal, the message, or the dataset. "Decode" may refer to extracting or recovering the information from the signal, the message, or the dataset. By way of example and not of limitation, the purpose of encoding and decoding may be to obfuscate the information during transmission or storage, to modulate a signal, to increase the efficiency of a communications or storage medium, or to convert one format into another format.

As used herein, "elevation angle" may refer to the angle between a line and the horizon.

As used in this disclosure, a "field of view" may refer to one or more angles that delimit an area from which electromagnetic radiation will be sensed by a person or an image sensor.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, an "image" may be an optical representation or reproduction of an indicia or of the appearance of something or someone.

As used in this disclosure, a "lens" may be a transparent substance through which light can pass. A lens may or may not be formed with curved surfaces that are used to concentrate or disperse the light that travels through the lens.

As used here, "monoscopic" may refer to an image captured from a single viewpoint and therefore lacking binocular vision cues.

As used in this disclosure, "opaque" may refer to an object or material that prevents the passage of light and/or other forms of radiations through the object or material.

As used in this disclosure, "orientation" may refer to the positioning and/or angular alignment of a first object relative to a second object or relative to a reference position or reference direction.

As used in this disclosure, a "sensor" may be a device that quantitatively measures a physical stimulus.

As used here, "stereoscopic" may refer to techniques for creating depth perception by presenting slightly different images to each eye. Each image may render the same scene as seem from different angles.

As used in this disclosure, "ultraviolet light" may refer to electromagnetic radiation with a wavelength from 10 nm to 400 nm, shorter than that of visible light but longer than X-rays.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A stereoscopic camera system for a welding torch comprising:
   a welding helmet and a camera assembly;
   wherein the welding helmet is adapted to be worn by a user to protect the user's face while the user operates metalworking equipment;

wherein the camera assembly couples to the metalworking equipment such that a workpiece is located within a field of view of one or more cameras located on the camera assembly;

wherein a display system coupled to the welding helmet is adapted to show the user the workpiece as seen by the one or more cameras;

wherein the camera assembly comprises a clamp assembly, a camera coupler, an articulated boom, and the one or more cameras;

wherein the clamp assembly removably couples to the metalworking equipment;

wherein the clamp assembly comprises a left jaw, a right jaw, a ball joint interface, and a plurality of tighteners;

wherein the left jaw and the right jaw are parallel plates that are operable to press against the metalworking equipment from opposing sides of the metalworking equipment;

wherein the ball joint interface is coupled to at least one of the left jaw and the right jaw;

wherein the articulated boom couples to the ball joint interface such that the articulated boom is repositionable.

2. The stereoscopic camera system for a welding torch according to claim 1 wherein the welding helmet comprises an opaque shell, a headband, and the display system;

wherein the welding helmet is adapted to protect the user from flash burn, sparks, infrared and ultraviolet light, heat, or any combination thereof;

wherein the opaque shell is adapted to be worn in front of the user's face and is held in place by the headband;

wherein the headband is adapted to adjust in order to match the size of the user's head.

3. The stereoscopic camera system for a welding torch according to claim 2 wherein the display system is a pair of active displays that are coupled to the front of the opaque shell;

wherein the display system is adapted to be positioned in front of the user's eyes.

4. The stereoscopic camera system for a welding torch according to claim 3 wherein the display system comprises a left eye display and a right eye display;

wherein the left eye display is adapted to be positioned in front of the user's left eye and the right eye display is adapted to be positioned in front of the user's right eye.

5. The stereoscopic camera system for a welding torch according to claim 4 wherein images presented on the left eye display and the right eye display are a sequence of frames that render the workpiece located within the field of view of the one or more cameras;

wherein the images presented on the left eye display and the images presented on the right eye display are controlled by a video controller located within the display system.

6. The stereoscopic camera system for a welding torch according to claim 5 wherein the images presented on the left eye display and the images presented on the right eye display are different.

7. The stereoscopic camera system for a welding torch according to claim 6 wherein the video controller receives one or more electrical signals from the one or more cameras;

wherein the video controller is adapted to control what the user sees in the display system by routing the one or more electrical signals to the left eye display and to the right eye display and by managing attributes of the images for viewability of the workpiece.

8. The stereoscopic camera system for a welding torch according to claim 7 wherein the video controller reduces the brightness of the images.

9. The stereoscopic camera system for a welding torch according to claim 7 wherein a left eye lens and a right eye lens are positioned within the display system;

wherein the left eye lens is adapted to shorten the focal length between the user's left eye and the left eye display;

wherein the right eye lens is adapted to shorten the focal length between the user's right eye and the right eye display.

10. The stereoscopic camera system for a welding torch according to claim 7 wherein the camera coupler is operable to support the one or more cameras;

wherein the articulated boom couples the camera coupler to the clamp assembly such that the orientation of the one or more cameras is adjustable.

11. The stereoscopic camera system for a welding torch according to claim 10 wherein the plurality of tighteners are operable to increase and decrease the amount of pressure applied to the metalworking equipment by the clamp assembly;

wherein the plurality of tighteners are loosened to reduce the pressure so that the clamp assembly;

wherein the plurality of tighteners are tightened to increase the pressure so that the clamp assembly.

12. The stereoscopic camera system for a welding torch according to claim 11 wherein the camera coupler is an armature to which the one or more cameras are coupled.

13. The stereoscopic camera system for a welding torch according to claim 12 wherein the articulated boom couples the camera coupler to the clamp assembly such that the one or more cameras are reoriented by repositioning the articulated boom and/or by repositioning the camera coupler;

wherein the bottom of the articulated boom is coupled to the clamp assembly via a lower ball joint;

wherein the lower ball joint enables the articulated boom to rotate 360 degrees and to change a boom elevation angle;

wherein the top of the articulated boom is coupled to the camera coupler via an upper ball joint;

wherein the upper ball joint enables the camera coupler to rotate 360 degrees and to change a camera coupler elevation angle.

14. The stereoscopic camera system for a welding torch according to claim 13 wherein the one or more cameras are operable to convert light from a scene in front of the one or more cameras into the one or more electrical signals that encode the image of the scene;

wherein the one or more electrical signals are routed to the left eye display and/or to the right eye display to render the original scene.

15. The stereoscopic camera system for a welding torch according to claim 14 wherein a first camera is coupled to the camera coupler;

wherein the camera coupler and the articulated boom are adjusted to point the first camera towards the workpiece;

wherein the first camera converts light visible within a first field of view into the one or more electrical signals;

wherein a first video cable transmits the one or more electrical signals from the first camera to the video controller;

wherein the video controller routes the one or more electrical signals from the first camera to the left eye display, to the right eye display, or to both.

16. The stereoscopic camera system for a welding torch according to claim 15 wherein the camera coupler is a T-shaped armature and a second camera is coupled to the camera coupler along with the first camera;

wherein the second camera is mounted at a predetermined separation distance from the first camera;

wherein the camera coupler and the articulated boom are adjusted to point the first camera and the second camera towards the workpiece;

wherein the second camera converts light visible within a second field of view into the one or more electrical signals;

wherein a second video cable transmits the one or more electrical signals from the second camera top the video controller;

wherein the video controller routes the one or more electrical signals from the first camera to the left eye display and the one or more electrical signals from the second camera to the right eye display to provide a stereoscopic view of the workpiece.

17. The stereoscopic camera system for a welding torch according to claim 16 wherein the first video cable and the second video cable merge to be routed through a single, multi-conductor cable.

18. The stereoscopic camera system for a welding torch according to claim 17 wherein an individual camera selected from the first camera and the second camera comprise an optical sensor which converts the pattern of light striking the optical sensor into the one or more electrical signals;

wherein the individual camera further comprises a camera lens to focus the light onto the optical sensor.

19. The stereoscopic camera system for a welding torch according to claim 18 wherein the individual camera comprises a heat sink at the end of the individual camera that is closest to the workpiece to assure than any heat generated by working the workpiece does not damage the optical sensor.

* * * * *